United States Patent
Wang

(10) Patent No.: US 9,557,848 B2
(45) Date of Patent: Jan. 31, 2017

(54) HANDHELD ELECTRONIC APPARATUS AND METHOD FOR CONTROLLING THE SAME

(71) Applicant: HTC CORPORATION, Taoyuan, Taoyuan County (TW)

(72) Inventor: Shiye Wang, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 83 days.

(21) Appl. No.: 14/520,886

(22) Filed: Oct. 22, 2014

(65) Prior Publication Data

US 2016/0117037 A1    Apr. 28, 2016

(51) Int. Cl.
  *G06F 3/041* (2006.01)
  *G06F 3/0346* (2013.01)
  *H04M 1/725* (2006.01)

(52) U.S. Cl.
  CPC ........... *G06F 3/0416* (2013.01); *G06F 3/0346* (2013.01); *H04M 1/72519* (2013.01); *H04M 2250/12* (2013.01); *H04M 2250/22* (2013.01)

(58) Field of Classification Search
  CPC combination set(s) only.
  See application file for complete search history.

(56) References Cited

U.S. PATENT DOCUMENTS

2013/0033418 A1* 2/2013 Bevilacqua ............. G06F 3/017
                                                              345/156
2015/0268025 A1* 9/2015 Huang .................... G01P 15/00
                                                              702/150

FOREIGN PATENT DOCUMENTS

CN        103369144 A    10/2013

* cited by examiner

Primary Examiner — Junpeng Chen
(74) Attorney, Agent, or Firm — Cantor Colburn LLP

(57) ABSTRACT

Handheld electronic apparatuses and methods for controlling a handheld electronic apparatus are provided. The handheld electronic apparatus includes a display having a touch panel, a proximity sensor, a communication unit, a processing unit, and a motion sensor. The communication unit establishes a call. The processing unit disables the touch panel during the call based on the detection of the presence of a nearby object to the proximity sensor. The motion sensor detects an instant acceleration value of the handheld electronic apparatus. The processing unit determines whether a value that is only related to the instant acceleration value is greater than an acceleration threshold while the touch panel is disabled during the call. The processing unit enables the touch panel during the call based on the determination that the value is greater than the acceleration threshold.

18 Claims, 9 Drawing Sheets

HANDHELD ELECTRONIC APPARATUS AND METHOD FOR CONTROLLING THE SAME

CROSS-REFERENCES TO RELATED APPLICATIONS

Not applicable.

BACKGROUND OF THE INVENTION

Field of the Invention

The present invention relates to handheld electronic apparatuses and methods for controlling a handheld electronic apparatus. More particularly, the present invention relates to handheld electronic apparatuses whose touch panel is properly controlled during a call and methods for controlling a touch panel of a handheld electronic apparatus during a call.

Descriptions of the Related Art

Technologies of handheld electronic apparatuses (e.g. smart phones and tablet computer) have been rapidly developed in recent years. Most handheld electronic apparatuses on the market today have phone functionalities and are each equipped with a display having a touch panel so that the user can control the handheld electronic apparatus (e.g. make a call) by simply touching the display.

When there is a need in talking to another party by a handheld electronic apparatus, the user may touch the phone number of the receiver shown on the display to establish a call. After the call has been established, the user may hold the handheld electronic apparatus and place it near the ear to have a conversation. The display of most handheld electronic apparatuses will automatically be turned off. During the call, there are some occasions that the user need to check information of the handheld electronic apparatus. When this happens, the user has to activate the display and the touch panel by himself or herself. This is inconvenient to the user especially when he or she is in a hurry.

Based on the aforementioned descriptions, it is understood that a handheld electronic apparatus whose touch panel can be properly controlled during a call and a method for controlling a touch panel of a handheld electronic apparatus during a call is still an urgent need.

SUMMARY OF THE INVENTION

The present invention provides handheld electronic apparatuses whose touch panel and even the display are properly controlled during a call. The present invention also provides methods for controlling a touch panel and even a display of a handheld electronic apparatus during a call.

The handheld electronic apparatus of the present invention comprises a display, a proximity sensor, a communication unit, a processing unit, and a motion sensor. The display comprises a touch panel. The communication unit is configured to establish a call. The processing unit is electrically connected to the display, the proximity sensor, and the communication unit. The processing unit is configured to disable the touch panel during the call based on a detection of presence of a nearby object of the proximity sensor. The motion sensor is electrically connected to the processing unit and configured to detect an instant acceleration value of the handheld electronic apparatus. The processing unit determines whether a value that is only related to the instant acceleration value is greater than an acceleration threshold while the touch panel is disabled during the call. The processing unit enables the touch panel during the call based on the determination that the value is greater than the acceleration threshold. A person having ordinary skill in the art can conceive the idea that the display of the handheld electronic apparatus can be disabled and enabled during the call by the same approach based on the above descriptions of the handheld electronic apparatus.

The method for controlling a touch panel of a handheld electronic apparatus comprises the following steps: (a) establishing a call by the handheld electronic apparatus, (b) disabling a touch panel of the handheld electronic apparatus during the call based on the detection of the presence of a nearby object of a proximity sensor, (c) determining whether a value related to an instant acceleration value of the handheld electronic apparatus is greater than an acceleration threshold while the touch panel is disabled during the call, the instant acceleration value being detected by a motion sensor, and (d) enabling the touch panel during the call based on a determination that the value is greater than the acceleration threshold. A person having ordinary skill in the art can conceive the idea that the display of the handheld electronic apparatus can be disabled and enabled during the call by the same approach based on the above descriptions of the method for controlling the touch panel of a handheld electronic apparatus.

According to the present invention, the touch panel of the handheld electronic apparatus is disabled during the call based on the detection of the presence of a nearby object with the proximity sensor of the handheld electronic apparatus. With this design, when a user puts the handheld electronic apparatus close to the face and ear to have a conversation after the call has been established, this action (i.e. putting the handheld electronic apparatus close to the face and ear) will be detected by the proximity sensor. As a consequence, the touch panel will be disabled and unwanted functionalities will not be activated accidentally. The display of the handheld electronic apparatus may be turned off based on the same condition. In this way, the user will not be bothered by the unpleasant brightness of the display during the call.

Moreover, a motion sensor is configured to detect an instant acceleration value of the handheld electronic apparatus. According to the present invention, a value that is only related to the instant acceleration value is compared with an acceleration threshold while the touch panel is disabled during the call. The touch panel will be enabled during the call based on the determination that the value is greater than the acceleration threshold. With this design, when the user needs to check information of the handheld electronic apparatus during the call and moves the handheld electronic apparatus (e.g. moving to a position in front of the user), this action will cause a great instant acceleration value and result in the automatic enabling of the touch panel. The display of the handheld electronic apparatus may be enabled based on the same condition. In this way, the present invention provides the user a pleasant and convenient user experience.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, the description of these embodiments is only for purpose of illustration rather than limitation. It should be appreciated that elements unrelated to the present invention are omitted from depiction in the following embodiments and the attached drawings.

Figure 1:
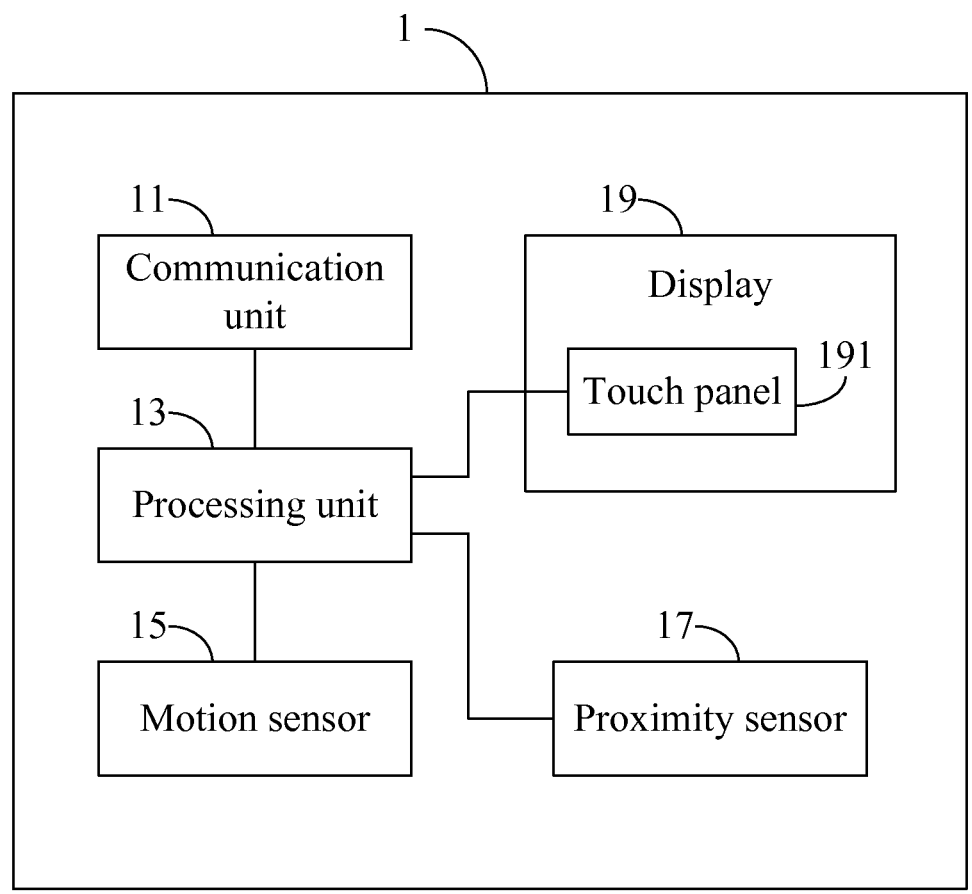
FIG. 1 illustrates the schematic view of the handheld electronic apparatus of the first and second embodiment.

The first embodiment of the present invention is a handheld electronic apparatus 1; a schematic view of which is illustrated in FIG. 1. The handheld electronic apparatus 1 comprises a communication unit 11, a processing unit 13, a motion sensor 15, a proximity sensor 17, and a display 19 comprising a touch panel 191. The handheld electronic apparatus 1 may be a smart phone, a tablet computer, or the like. The processing unit 13 is electrically connected to the communication unit 11, the motion sensor 15, the proximity sensor 17, and the display 19.

The communication unit 11 may be any unit, module, or device that can establish a call with another apparatus (e.g. another phone or another handheld electronic apparatus). The processing unit 13 may be any of various processors, central processing units (CPUs), microprocessors, or other computing devices that are well-known by persons having ordinary skill in the art. The motion sensor 15 may be any unit, module, or device that can detect an instant acceleration value of the handheld electronic apparatus 1 such as a gravity sensor, an accelerometer, and a gyro meter. The aforesaid instant acceleration value is a value that indicates a degree of acceleration of the handheld electronic apparatus 1 within a predetermined time interval. The proximity sensor 17 may be any unit, module, or device that can detect the presence of a nearby object. The display 19 may be any display unit, module, or device well known by persons having ordinary skill in the art. Likewise, the touch panel 191 may be any touch panel well known by persons having ordinary skill in the art.

When a user intends to call another party by the handheld electronic apparatus 1, the user touches the phone number of the receiver shown on the display 19 via the touch panel 191.

The communication unit 11 establishes a call in response to the user's touch of the phone number. It is noted that both the display 19 and the touch panel 191 are on during the aforementioned procedure of establishing the call.

The proximity sensor 17 is on and is able to detect the presence of a nearby object (not shown) of the proximity sensor 17. In this embodiment, the handheld electronic apparatus 1 is designed in a way that the processing unit 13 disables the touch panel 191 during the call based on the detection of presence of nearby objects of the proximity sensor 17. Hence, when the user put the handheld electronic apparatus 1 close to his or her face and ear in order to have a conversation after the call has been established, this action (i.e. putting the handheld electronic apparatus 1 close to the face and ear) will be detected by the proximity sensor 17. As a consequence, the touch panel 191 will be disabled so that unwanted functionalities will not be accidently activated.

In some other embodiments, the display 19 of the handheld electronic apparatus 1 may be disabled during a call based on the same condition (i.e. during the call based on the detection of presence of the nearby object of the proximity sensor 17). For those embodiments, the user will not be bothered by the unpleasant brightness of the display 19 during the call.

During the call, the motion sensor 15 is on and is configured to detect an instant acceleration value (not shown) of the handheld electronic apparatus 1. While the touch panel 191 is disabled during the call, the processing unit 13 determines whether a value (not shown) that is only related to the instant acceleration value is greater than an acceleration threshold (not shown). The processing unit 13 enables the touch panel 191 during the call based on the determination that the value is greater than the acceleration threshold. With this design, when the user moves the handheld electronic apparatus 1 severely (e.g. when the user needs to check information of the handheld electronic apparatus 1 during the call and moves the handheld electronic apparatus 1 to a position in front of the user), this action will cause a great instant acceleration value and result in the touch panel 191 being automatically enabled. As to the scenario that the user is still on the phone but moves the handheld electronic apparatus 1 slightly around his or her ear, the touch panel 191 will not be erroneously enabled. Briefly speaking, when the user moves the handheld electronic apparatus 1 in a way that a value that is only related to the instant acceleration value is greater than the acceleration threshold, the touch panel 191 will be automatically enabled.

In some other embodiments, the display 19 of the handheld electronic apparatus 1 may be enabled based on the same condition (i.e. during the call based on a determination that the value that is only related to the instant acceleration value is greater than the acceleration threshold). In this way, the present invention provides the user a pleasant and convenient user experience.

According to the above descriptions, it is learned that the touch panel 191 of the handheld electronic apparatus 1 and even the display 19 of the handheld electronic apparatus 1 are properly controlled during a call with the assistances of the motion sensor 15 and the proximity sensor 17. A pleasant user experience can therefore be achieved.

FIG. 1 illustrates the second embodiment of the present invention. In the second embodiment, the handheld electronic apparatus 1 performs similar operations with similar functionalities, and achieve similar results as those described in the first embodiment. Hence, only the differences between the two embodiments are described in details herein.

In this embodiment, the touch panel 191 is disabled during the call based on the same condition as those described in the first embodiment (i.e. during the call and based on the detection of the presence of the nearby object of the proximity sensor 17). However, the touch panel 191 is enabled during the call based on different conditions in the two embodiments.

In this embodiment, the touch panel 191 will be enabled during the call based on two conditions. The first condition is that the proximity sensor 17 detects no presence of nearby object (i.e. the proximity sensor 17 does not detect of the presence of nearby object), while the second condition is the processing unit 13 that determines that the value that is only related to the instant acceleration value is greater than the acceleration threshold. When both the first and second conditions are met, the processing unit 13 enables the touch panel 191 during the call accordingly. Please note that the processing unit 13 may also enable the display 19 during the call based on no presence of a nearby object of the proximity sensor 17 and the determination that the value that is only related to the instant acceleration value is greater than the acceleration threshold.

Since the touch panel 191 will be enabled during the call based on no detection of presence of a nearby object of the proximity sensor 17 in addition to the determination that the value is greater than the acceleration threshold, the time for enabling the touch panel 191 and even the display 19 during the call will be determined more accurately. Two concrete examples are discussed herein. In the first example, the user is still on the phone but suddenly stands up (or suddenly sit down). When this happens, a value that is only related to the instant acceleration value is greater than the acceleration threshold and the proximity sensor 17 detects presence of a nearby object. Therefore, the touch panel 191 will not be erroneously enabled. In the second example, the user needs to check information of the handheld electronic apparatus 1 during the call and moves the handheld electronic apparatus 1 to a position in front of the user. When this happens, a value that is only related to the instant acceleration value is greater than the acceleration threshold and the proximity sensor 17 detects no presence of a nearby object. Hence, the touch panel 191 is automatically enabled. With the design of the second embodiment, the touch panel 191 and even the display 19 will not be enabled erroneously.

Figure 2:
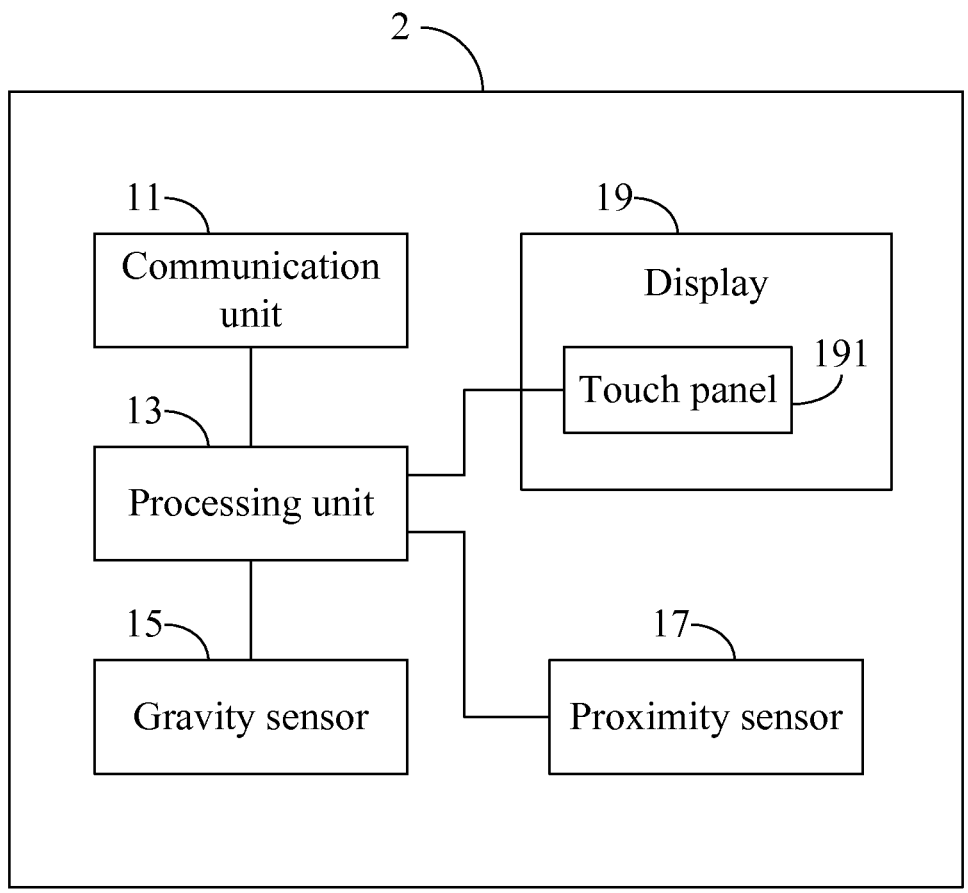
FIG. 2 illustrates the schematic view of the handheld electronic apparatus of the third embodiment.

The third embodiment of the present invention is a handheld electronic apparatus 2 and a schematic view of which is illustrated in FIG. 2. The handheld electronic apparatus 2 comprises the communication unit 11, the processing unit 13, a gravity sensor 25, the proximity sensor 17, and the display 19, wherein the display 19 comprises the touch panel 191. The handheld electronic apparatus 2 may be a smart phone, a tablet computer, or the like. The processing unit 13 is electrically connected to the communication unit 11, the gravity sensor 25, the proximity sensor 17, and the display 19. Comparing to the first and second embodiments, the motion sensor is specialized to the gravity sensor 25 in the third embodiment. It is noted that the communication unit 11, the processing unit 13, the proximity sensor 17, and the display 19 in this embodiment performs similar operations, have similar functionalities, and achieve similar results as those described in the first and second embodiments. Hence, only the details related to the gravity sensor 25 will be described herein.

In this embodiment, the touch panel 191 is disabled during the call based on the same conditions as those described in the first or second embodiment. The display 19 may also be disabled during the call based on the same conditions as those described in the first or second embodiment. However, the touch panel 191 is enabled during the call based on different conditions. Similarly, the display 19 may be enabled during the call differently.

In this embodiment, the gravity sensor 25 is configured to detect an instant acceleration value of the handheld electronic apparatus 2. To be more specific, the instant acceleration value detected by the gravity sensor 25 comprises a first direction value, a second direction value, and a third direction value (e.g. an x-direction value, a y-direction value, and a z-direction value).

While the touch panel 191 is disabled during the call, the processing unit 13 determines whether a value (not shown) that is only related to the instant acceleration value is greater than an acceleration threshold (not shown). Depending on the requirement of the user or the design of the handheld electronic apparatus 2, the value may be only related to one of the three direction values (e.g. the first direction value), to two of the three direction values (e.g. the first direction value and the second direction value), or to all of the three direction values. To be more specific, the processing unit 13 may determine which direction values that the value is related to based on the first direction value, the second direction value, and the third direction value. Several examples for making such a determination are given herein.

As the first example, the processing unit 13 may calculate the first difference between the first direction value and the second direction value and determines which direction values that the value is related to based on the first difference.

As a second example, the processing unit 13 may calculate the first difference between the first direction value and the second direction value, calculate the second difference between the first direction value and the third direction value, and determines that the value is only related to the first direction value. For example, when it is determined that both the first difference and the second difference are greater than a predetermined threshold, this means that the first direction value is much greater than the second direction value and the third direction value. Therefore, the processing unit 13 determines that the value used for comparison with an acceleration threshold is only related to the first direction value.

As a third example, the processing unit 13 may calculate the first difference between the first direction value and the second direction value, calculate the second difference between the third direction value and the second direction value, and determines that the value is only related to the first direction value and the third direction value. For example, when it is determined that both the first difference and the second difference are greater than a predetermined threshold, it means that the second direction value is much smaller than the first direction value and the third direction value. Hence, the processing unit 13 determines that the value used for comparison with an acceleration threshold is only related to the first direction value and the third direction value.

As a fourth example, the processing unit 13 may determine that the first direction value, the second direction value, and the third direction value are close to each other. Hence, the processing unit 13 determines that the value used for comparing with an acceleration threshold is related to the first direction value, the second direction value, and the third direction value.

After the processing unit 13 determines the value used for comparison with an acceleration threshold, the processing unit 13 determines whether the value is greater than the acceleration threshold and enables the touch panel 191 during the call based on the determination that the value is greater than the acceleration threshold. Yet in some other embodiments, the processing unit 13 may enable the touch panel 191 during the call based on no detection of presence of a nearby object to the proximity sensor in addition to the determination that the value is greater than the acceleration threshold.

With this design, when the user moves the handheld electronic apparatus 1 in any direction suddenly during the call, the gravity sensor 25 will generate an instant acceleration value with a great direction value corresponding to that moving direction (or several great direction values corresponding to those moving directions) and result in the touch panel 191 and even the display 19 being automatically enabled.

Figure 3:
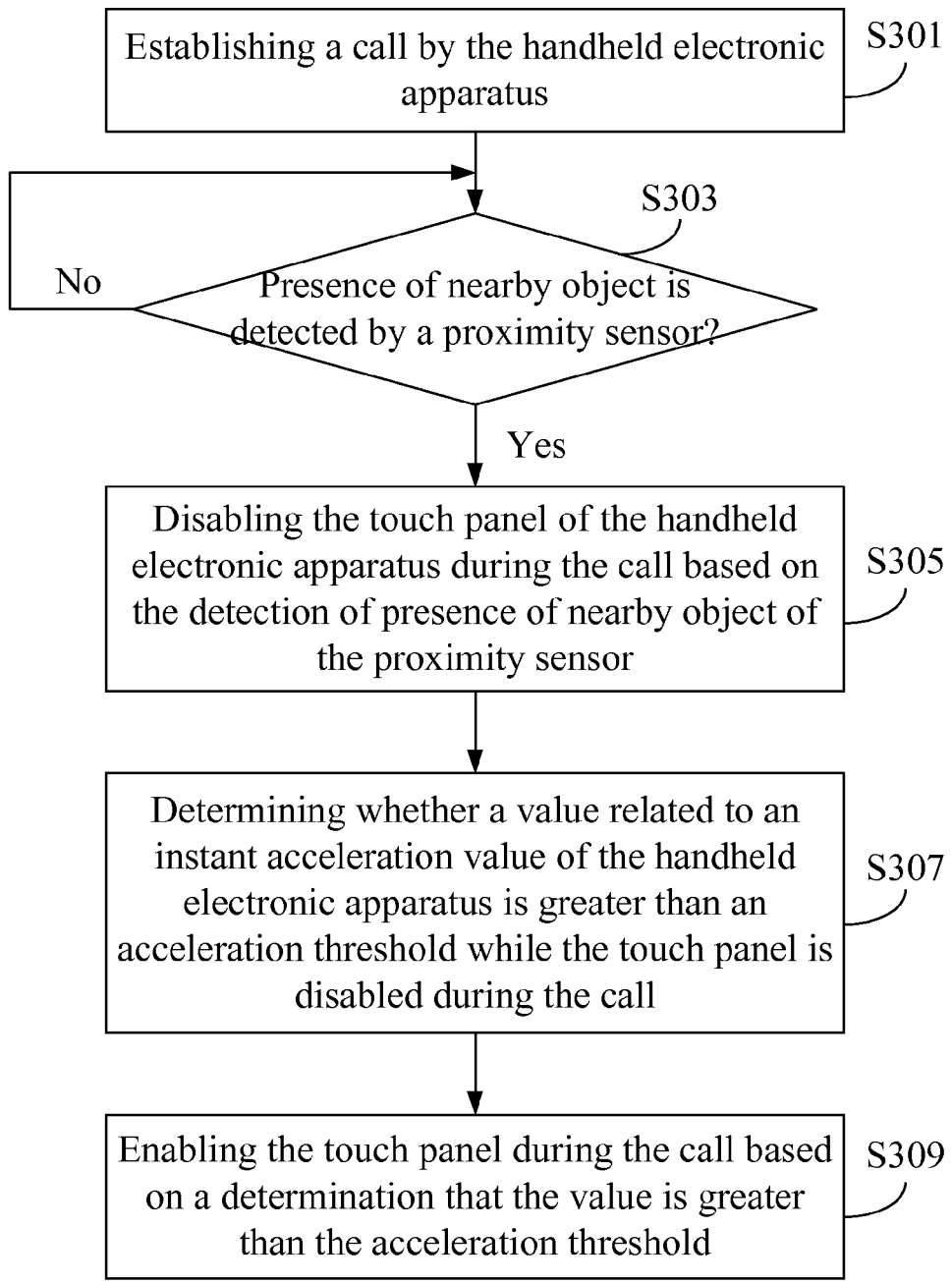
FIG. 3 illustrates the flowchart of the method for controlling the handheld electronic apparatus of the fourth embodiment.

The fourth embodiment of the present invention is a method for controlling a handheld electronic apparatus (e.g. the handheld electronic apparatus 1 in the first embodiment) and whose flowchart is illustrated in FIG. 3.

When a user intends to call another party by the handheld electronic apparatus, the user touches the phone number of the receiver shown on a display of the handheld electronic apparatus via a touch panel of the handheld electronic apparatus.

After the user touches the phone number of the receiver, step S301 is executed for establishing a call by the handheld electronic apparatus. Next, step S303 is executed for determining whether the presence of a nearby object is detected by the proximity sensor of the handheld electronic apparatus. If the determination result of step S303 is no, the method repeats step S303 after a predetermined time interval (e.g. after several seconds). If the determination result of step S303 is yes, step S305 is executed for disabling the touch panel of the handheld electronic apparatus during the call based on the detection of presence of a nearby object of the proximity sensor.

Next, step S307 is executed for determining whether a value related to an instant acceleration value of the handheld electronic apparatus is greater than an acceleration threshold while the touch panel is disabled during the call. It is noted that the instant acceleration value is detected by the motion sensor of the handheld electronic apparatus. After that, step S309 is executed for enabling the touch panel (or even the display) during the call based on a determination that the value is greater than the acceleration threshold. In some other embodiments, the step S309 may enable the display based on the same condition as well.

In addition to the aforesaid steps, the fourth embodiment can execute all the operations and functions set forth in the first embodiment. The method in which the fourth embodiment executes these operations and functions will be readily appreciated by those of ordinary skill in the art based on the explanation of the first embodiment, and thus, will not be further described therein.

With the method of the fourth embodiment, the touch panel of the handheld electronic apparatus and even the display of the handheld electronic apparatus can be properly enabled and disabled during a call with the assistances of the motion sensor and the proximity sensor. A pleasant user experience can therefore be achieved.

Figure 4:
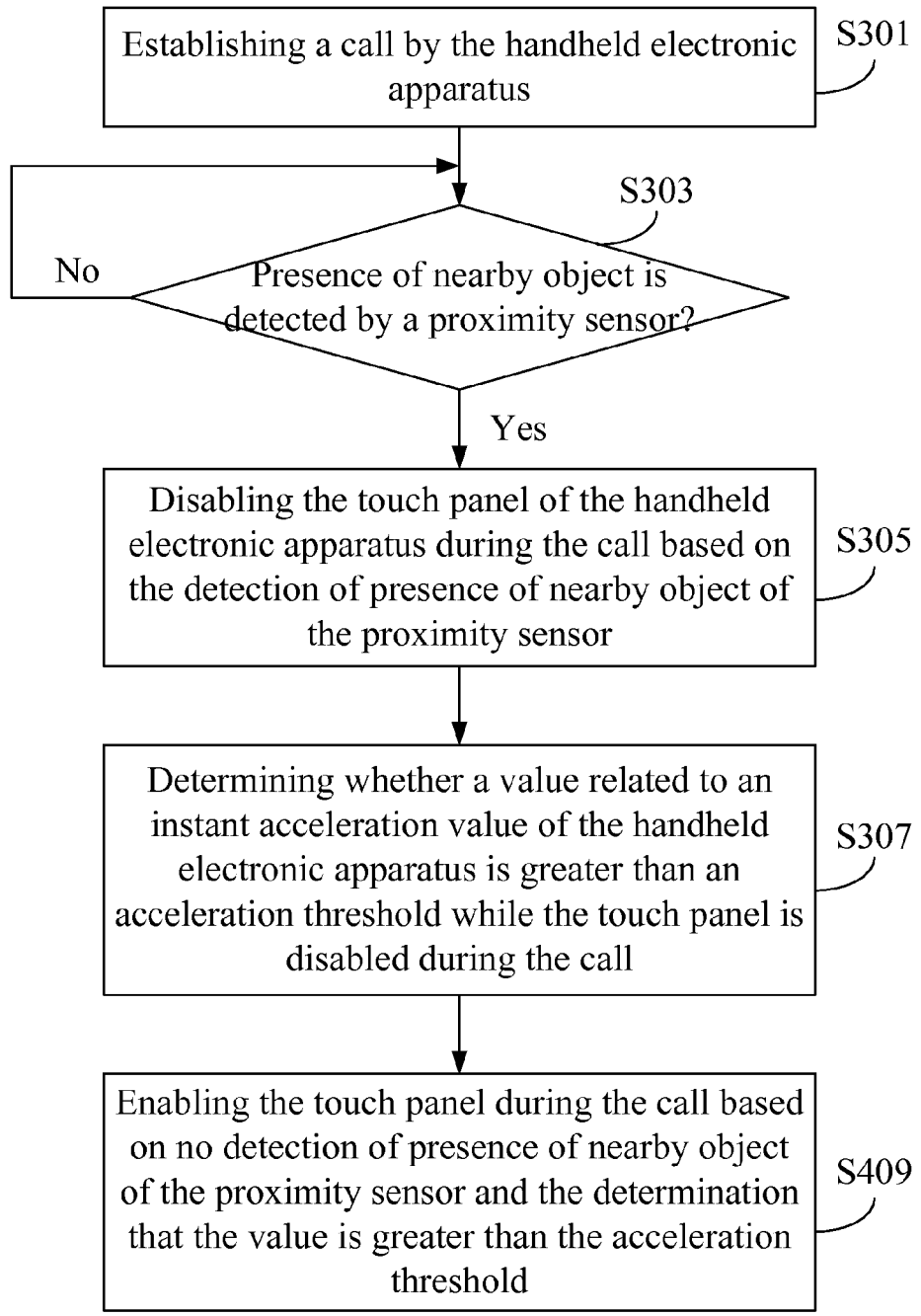
FIG. 4 illustrates the flowchart of the method for controlling the handheld electronic apparatus of the fifth embodiment.

The fifth embodiment of the present invention is a method for controlling a handheld electronic apparatus (e.g. the handheld electronic apparatus 1 in the second embodiment) and whose flowchart is illustrated in FIG. 4. Most steps of the method in the fifth embodiment are similar to those is the fourth embodiment; hence, only the differences between the two embodiments are described in details herein.

The method of the fifth embodiment also executes steps S301 to S307. Afterwards, step S409 is executed for enabling the touch panel during the call based on no detection of presence of nearby object of the proximity sensor and the determination that the value is greater than the acceleration threshold. In some other embodiments, the step S409 may enable the display based on the same conditions as well. Since two conditions are utilized for determining whether to enable the touch panel and the display, the time for enabling the touch panel and even the display during the call will be determined more accurately in this embodiment.

Figure 5:
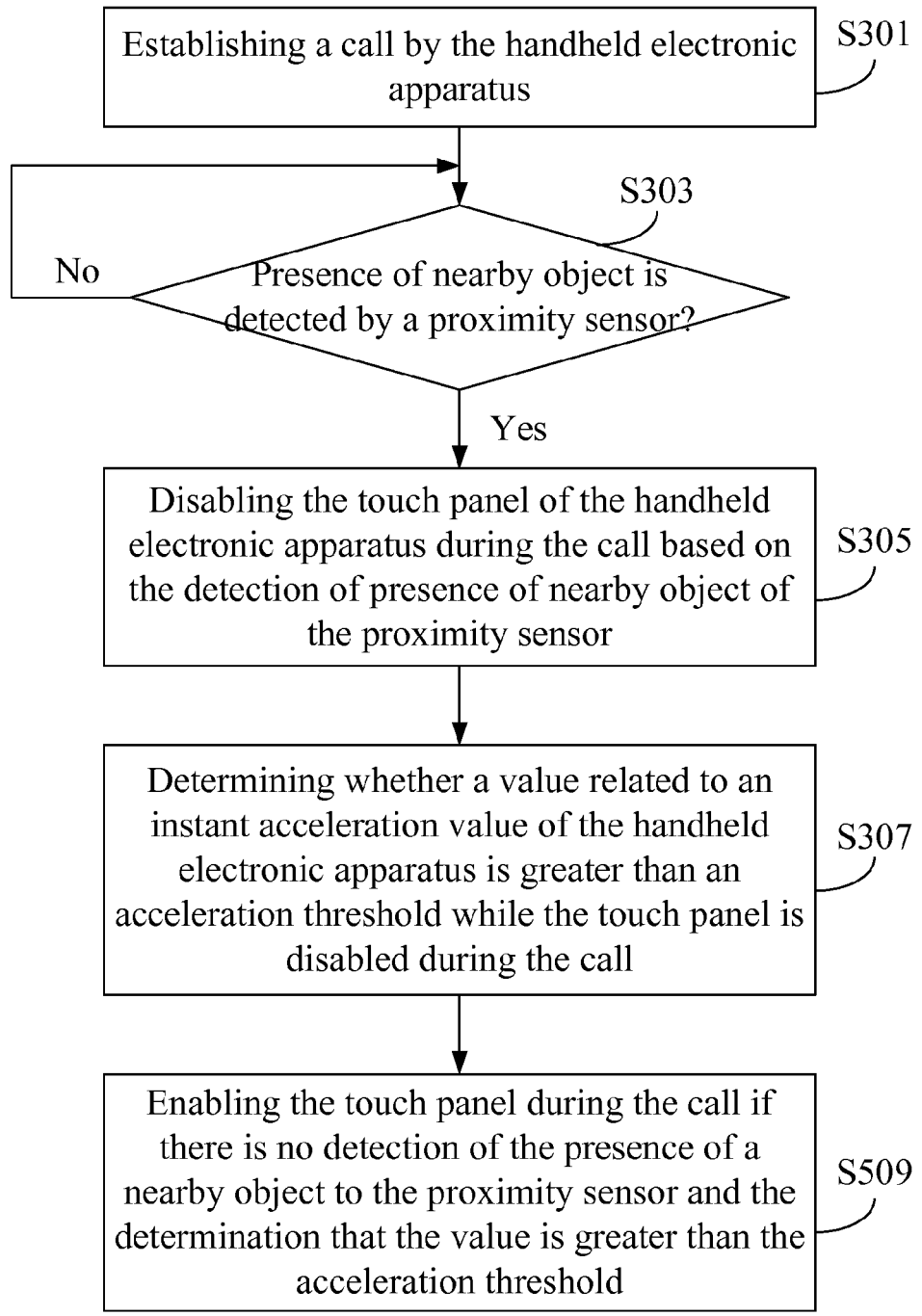
FIG. 5 illustrates the flowchart of the method for controlling the handheld electronic apparatus of the sixth embodiment.

The sixth embodiment of the present invention is a method for controlling a handheld electronic apparatus (e.g. the handheld electronic apparatus 1 in the second embodiment) and whose flowchart is illustrated in FIG. 5. Most steps of the method in the sixth embodiment are similar to those is the fifth embodiment; hence, only the differences between the two embodiments are described in details herein.

The method of the sixth embodiment also executes steps S301 to S307. Afterwards, step S509 is executed for enabling the touch panel during the call if there is no detection of the presence of a nearby object to the proximity sensor and the determination that the value is greater than the acceleration threshold. Similarly, in some other embodiments, the step S509 may enable the display based on the same conditions as well. Since the method in this embodiment also utilizes two conditions for determining whether to enable the touch panel and the display, the time for enabling the touch panel and even the display during the call will be determined more accurately in this embodiment as well.

Figure 6:
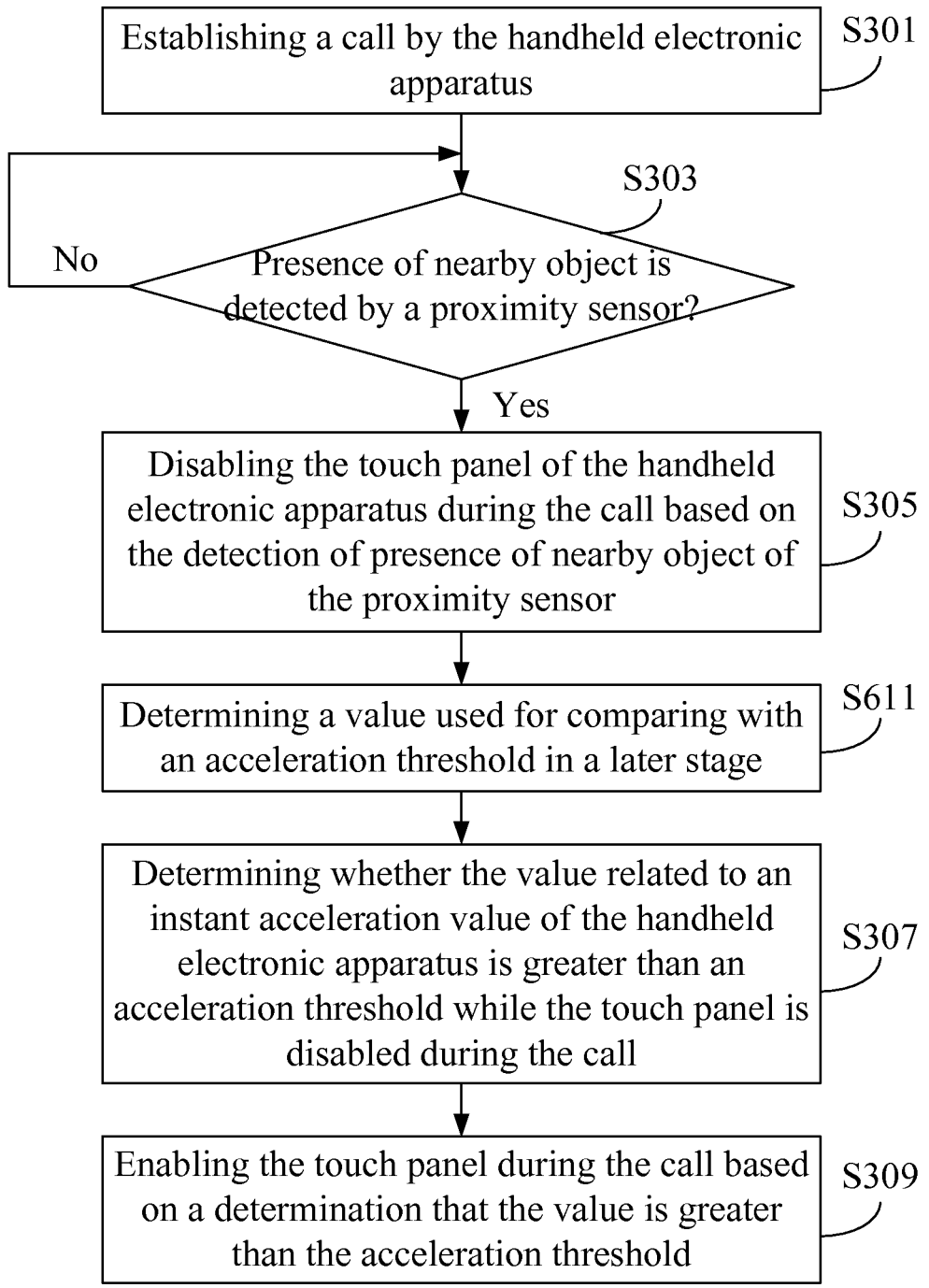
FIG. 6 illustrates the flowchart of the method for controlling the handheld electronic apparatus of the seventh embodiment.

The seventh embodiment of the present invention is a method for controlling a handheld electronic apparatus that comprises a gravity sensor instead of a motion sensor (e.g. the handheld electronic apparatus 2 in the third embodiment) and whose flowchart is illustrated in FIG. 6. Most steps of the method in the seventh embodiment are similar to those described is the fourth to sixth embodiments; hence, only the differences between the seventh embodiment and the previous embodiments are described in details herein.

In this embodiment, the method also executes steps S301 to S305. Since the method in this embodiment is for controlling a handheld electronic apparatus comprising a gravity sensor, the instant acceleration value detected by the gravity sensor comprises a first direction value, a second direction value, and a third direction value (e.g. an x-direction value, a y-direction value, and a z-direction value).

Next, step S611 is executed for determining a value used for comparing with the acceleration threshold in a later stage (i.e. the following step S307). The step S611 can make such a determination based on the first direction value, the second direction value, and the third direction value. The value determined in the step S611 may be only related to the first direction value, may be only related to the first direction value and the second direction value, or may be only related to the first direction value, the second direction value, and the third direction value.

Afterwards, the step S307 is executed for determining whether the value determined in the step S611 is greater than the acceleration threshold while the touch panel is disabled during the call. Following that, the step S309 is executed for enabling the touch panel during the call based on a determination that the value is greater than the acceleration threshold. It is noted that the step S309 may be replaced by the step S409 or the step 509 in some other embodiments, which should be able to be appreciated by persons having ordinary skill in the art based on the above descriptions.

Figure 7:
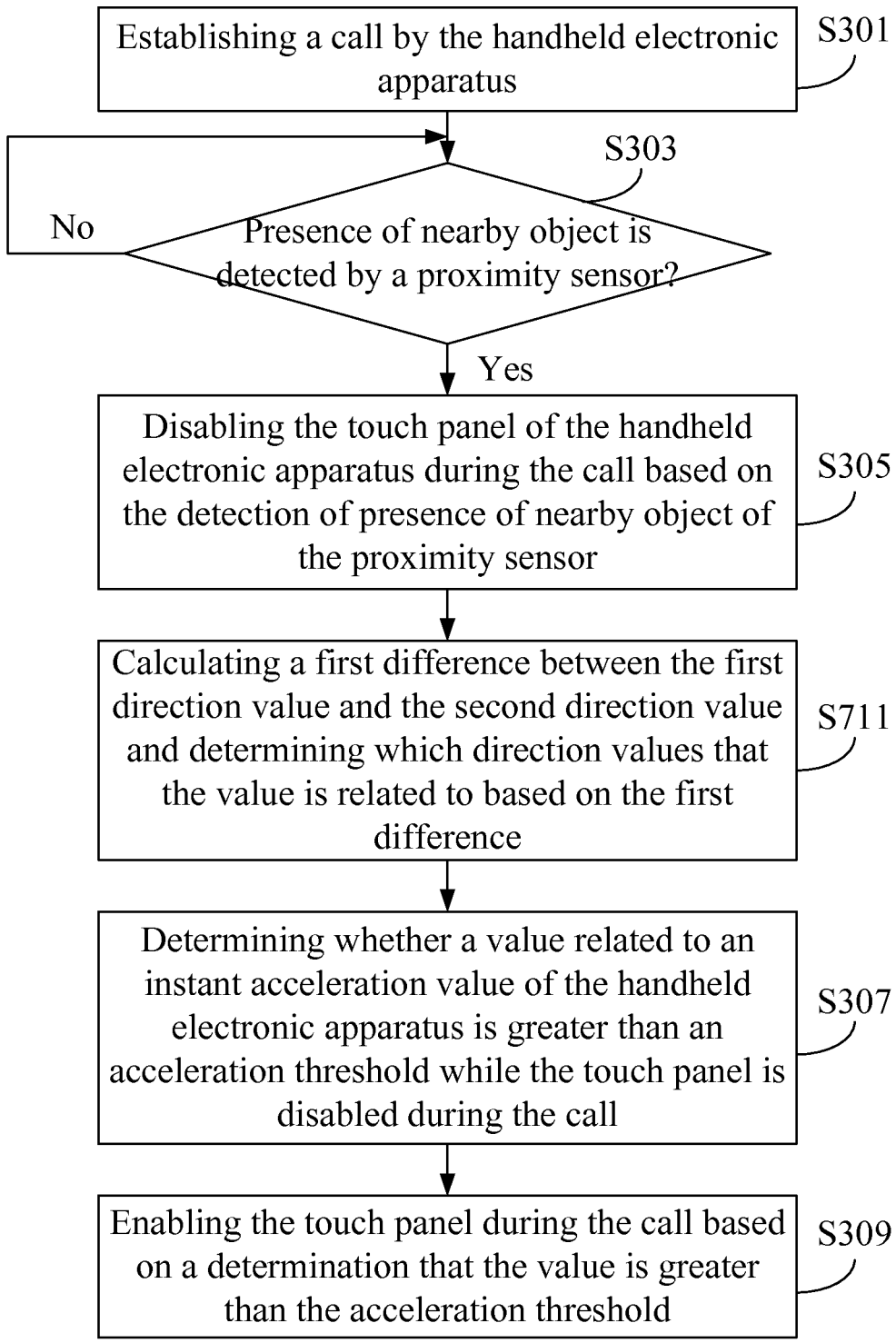
FIG. 7 illustrates the flowchart of the method for controlling the handheld electronic apparatus of the eighth embodiment.

The eighth embodiment of the present invention is a method for controlling a handheld electronic apparatus that comprises a gravity sensor instead of a motion sensor (e.g. the handheld electronic apparatus 2 in the third embodiment) and whose flowchart is illustrated in FIG. 7. Most steps of the method in the eighth embodiment are similar to those described is the seventh embodiment; hence, only the differences between the two embodiments are described in details herein.

The method of this embodiment also executes steps S301 to S305. Next, step S711 is executed for calculating a first difference between the first direction value and the second direction value and then determining which direction values that the value is related to based on the first difference. Afterwards, the step S307 and the step S309 are executed. Similarly, the step S309 may be replaced by the step S409 or the step 509 in some other embodiments, which should be able to be appreciated by persons having ordinary skill in the art based on the above descriptions.

Figure 8:
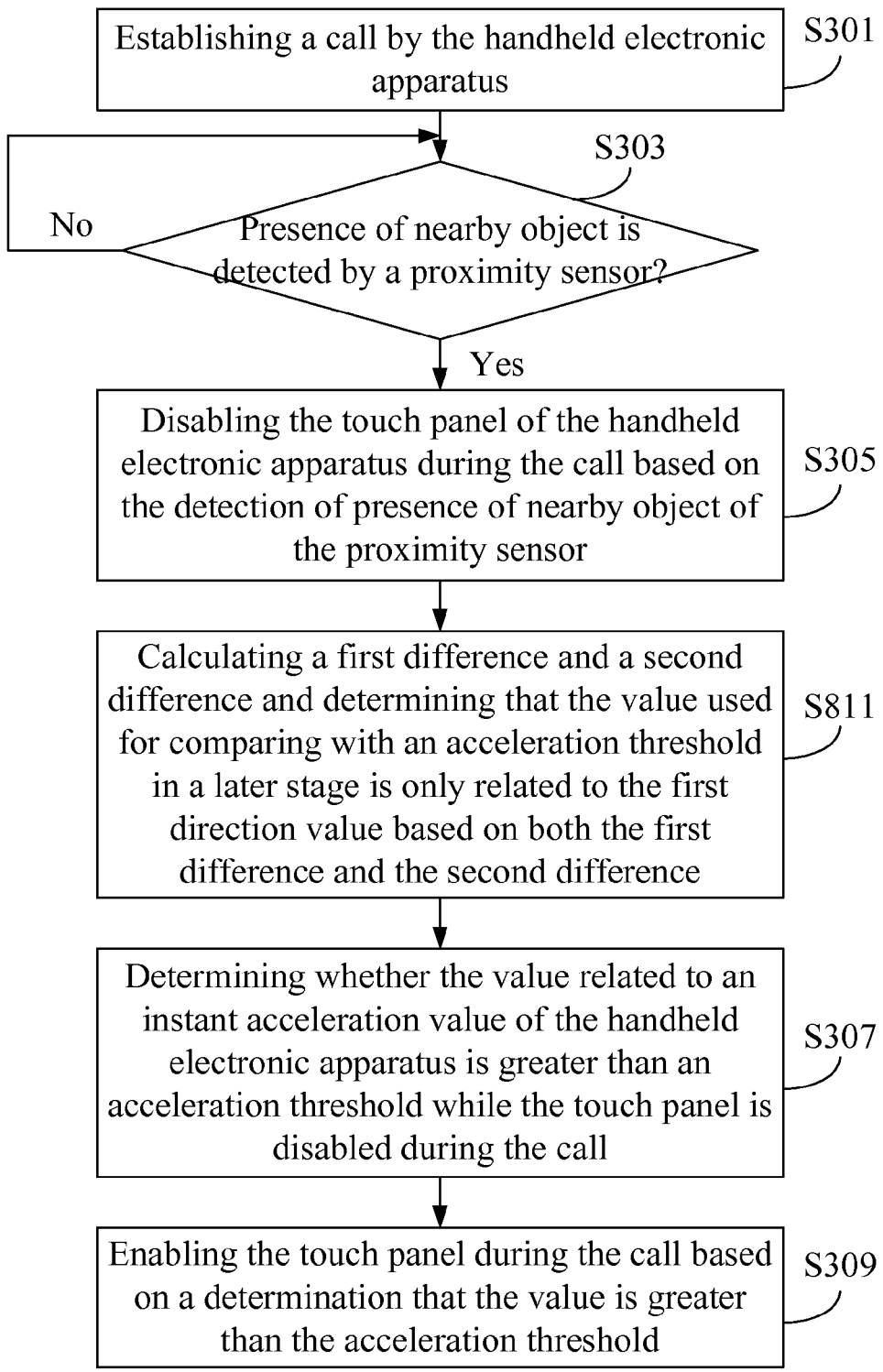
FIG. 8 illustrates the flowchart of the method for controlling the handheld electronic apparatus of the ninth embodiment.

The ninth embodiment of the present invention is a method for controlling a handheld electronic apparatus that comprises a gravity sensor instead of a motion sensor (e.g. the handheld electronic apparatus 2 in the third embodiment) and whose flowchart is illustrated in FIG. 8. Most steps of the method in the ninth embodiment are similar to those described is the eighth embodiment; hence, only the differences between the two embodiments are described in details herein.

The method of this embodiment also executes steps S301 to S305. Next, step S811 is executed for calculating a first difference between the first direction value and the second direction value, calculating a second difference between the first direction value and the third direction value, and determining that the value is only related to the first direction value based on both the first difference and the second difference. Following that, the step S307 and the step S309 are executed. Similarly, the step S309 may be replaced by the step S409 or the step 509 in some other embodiments, which should be able to be appreciated by persons having ordinary skill in the art based on the above descriptions.

Figure 9:
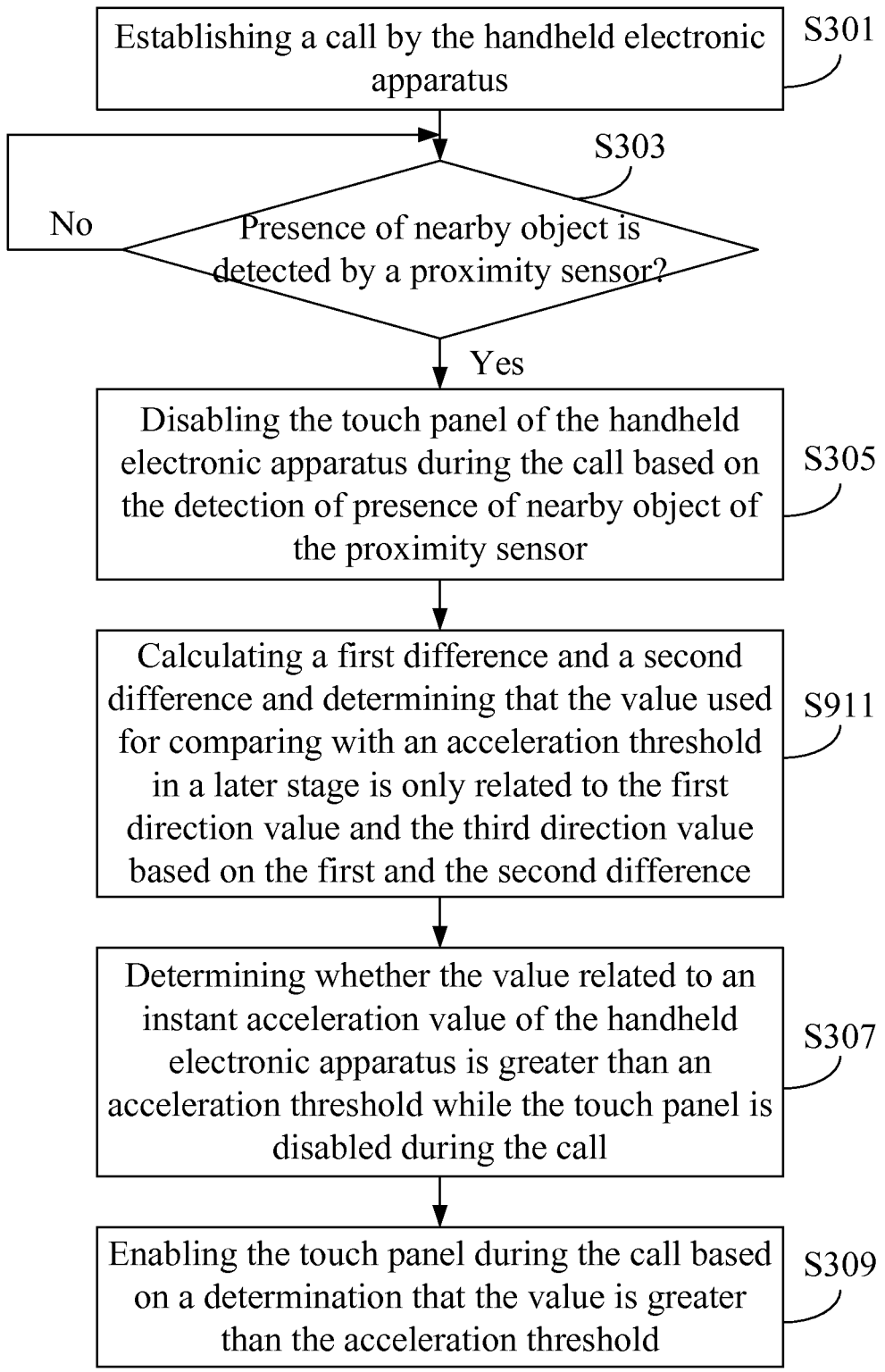
FIG. 9 illustrates the flowchart of the method for controlling the handheld electronic apparatus of the tenth embodiment.

The tenth embodiment of the present invention is a method for controlling a handheld electronic apparatus that comprises a gravity sensor instead of a motion sensor (e.g. the handheld electronic apparatus 2 in the third embodiment) and whose flowchart is illustrated in FIG. 9. Most steps of the method in the tenth embodiment are similar to those described is the ninth embodiment; hence, only the differences between the two embodiments are described in details herein.

The method of this embodiment also executes steps S301 to S305. Next, step S911 is executed for calculating a first difference between the first direction value and second direction value, calculating a second difference between the third direction value and the second direction value, and determining that the value is only related to the first direction value and the third direction value. Following that, the step S307 and the step S309 are executed. Similarly, the step S309 may be replaced by the step S409 or the step 509 in some other embodiments, which should be able to be appreciated by persons having ordinary skill in the art based on the above descriptions.

According to the aforementioned descriptions, the touch panel and even the display of the handheld electronic apparatus are disabled during the call based on the detection of the presence of a nearby object to the proximity sensor of the handheld electronic apparatus. With this design, when a user puts the handheld electronic apparatus close to the face and ear to have a conversation after the call has been established, the touch panel will be disabled and unwanted functionalities will not be activated accidentally.

Moreover, the motion sensor (or gravity sensor) is configured to detect an instant acceleration value of the handheld electronic apparatus during the call. A value that is only related to the instant acceleration value is compared with an acceleration threshold while the touch panel is disabled during the call. The touch panel and even the display will be enabled during the call based on the determination that the value is greater than the acceleration threshold. In some embodiments, the touch panel and even the display will be enabled during the call because there is no detection of the presence of the nearby object of the proximity sensor and the determination that the value is greater than the acceleration threshold. With this design, when the user needs to check the information of the handheld electronic apparatus during the call and moves the handheld electronic apparatus, the touch panel and even the display will be enabled automatically. In this way, the present invention provides the user a pleasant and convenient user experience.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A handheld electronic apparatus, comprising:
a display, comprising a touch panel;
a proximity sensor;
a communication unit, being configured to establish a call;
a processing unit, being electrically connected to the display, the proximity sensor, and the communication unit and configured to disable the touch panel during the call based on a detection of presence of nearby object of the proximity sensor; and
a motion sensor, being electrically connected to the processing unit and configured to detect an instant acceleration value of the handheld electronic apparatus, wherein the instant acceleration value comprises an X-direction value, a Y-direction value, and a Z-direction value;
wherein the processing unit determines a value that is only related to the instant acceleration value relates to at least one of the X-direction value, the Y-direction value, and the Z-direction value based on at least a first difference between two of the X-direction value, the Y-direction value, and the Z-direction value and determines whether the value is greater than an acceleration threshold while the touch panel is disabled during the call and the processing unit enables the touch panel during the call based on a determination that the value is greater than the acceleration threshold.

2. The handheld electronic apparatus of claim 1, wherein the touch panel is enabled by the processing unit during the call based on no detection of presence of nearby object of the proximity sensor and the determination that the value is greater than the acceleration threshold.

3. The handheld electronic apparatus of claim 1, wherein the touch panel is enabled by the processing unit during the call if there is no detection of presence of nearby object of the proximity sensor and the value is greater than the acceleration threshold.

4. The handheld electronic apparatus of claim 1, wherein the motion sensor is a gravity sensor.

5. The handheld electronic apparatus of claim 1, wherein the value is only related to one of the X-direction value, the Y-direction value, and the Z-direction value.

6. The handheld electronic apparatus of claim 1, wherein the value is only related to two of the X-direction value, the Y-direction value, and the Z-direction value.

7. The handheld electronic apparatus of claim 1, wherein the value is related to the X-direction value, the Y-direction value, and the Z-direction value.

8. The handheld electronic apparatus of claim 1, wherein the processing unit determines that the value is only related to one of the X-direction value, the Y-direction value, and the Z-direction value further based on a second difference between two of the X-direction value, the Y-direction value, and the Z-direction value, wherein the direction values used for calculating the first difference and the direction values used for calculating the second difference are not all the same.

9. The handheld electronic apparatus of claim 1, wherein the processing unit determines that the value is only related to two of the X-direction value, the Y-direction value, and the Z-direction value further based on a second difference between two of the X-direction value, the Y-direction value, and the Z-direction value, wherein the direction values used for calculating the first difference and the direction values used for calculating the second difference are not all the same.

10. A method for controlling a handheld electronic apparatus, comprising the following steps of:
    (a) establishing a call by the handheld electronic apparatus;
    (b) disabling a touch panel of the handheld electronic apparatus during the call based on a detection of presence of nearby object of a proximity sensor;
    (c) determining a value that is only related to an instant acceleration value of the handheld electronic apparatus relates to at least one of an X-direction value, a Y-direction value, and a Z-direction value comprised by the instant acceleration value based on at least a first difference between two of the X-direction value, the Y-direction value, and the Z-direction value;
    (d) determining whether the value is greater than an acceleration threshold while the touch panel is disabled during the call, the instant acceleration value being detected by a motion sensor; and
    (e) enabling the touch panel during the call based on a determination that the value is greater than the acceleration threshold.

11. The method of claim 10, wherein the touch panel is enabled during the call based on no detection of presence of nearby object of the proximity sensor and the determination that the value is greater than the acceleration threshold.

12. The method of claim 10, wherein the touch panel is enabled during the call if there is no detection of presence of nearby object of the proximity sensor and the value is greater than the acceleration threshold.

13. The method of claim 10, wherein the motion sensor is a gravity sensor.

14. The method of claim 10, wherein the value is only related to one of the X-direction value, the Y-direction value, and the Z-direction value.

15. The method of claim 10, wherein the value is only related to two of the X-direction value, the Y-direction value, and the Z-direction value.

16. The method of claim 10, wherein the value is related to the X-direction value, the Y-direction value, and the Z-direction value.

17. The method of claim 10, wherein the step (c) determines that the value is only related to one of the X-direction value, the Y-direction value, and the Z-direction value further based on a second difference between two of the X-direction value, the Y-direction value, and the Z-direction value, wherein the direction values used for calculating the first difference and the direction values used for calculating the second difference are not all the same.

18. The method of claim 10, wherein the step (c) determines that the value is only related to two of the X-direction value, the Y-direction value, and the Z-direction value further based on a second difference between two of the X-direction value, the Y-direction value, and the Z-direction value, wherein the direction values used for calculating the first difference and the direction values used for calculating the second difference are not all the same.

* * * * *